(12) United States Patent
Bergerhoff et al.

(10) Patent No.: US 8,009,023 B2
(45) Date of Patent: Aug. 30, 2011

(54) ACCESS ARRANGEMENT FOR A VEHICLE

(75) Inventors: Nikolas Bergerhoff, Regensburg (DE); Herbert Froitzheim, Pettendorf (DE); Thomas Klement, Regenstauf (DE); Wolfgang Piesch, Regenstauf (DE); Roland Wagner, Donaustauf (DE)

(73) Assignee: Continental Automotive GmbH, Hannover (DE)

( * ) Notice: Subject to any disclaimer, the term of this patent is extended or adjusted under 35 U.S.C. 154(b) by 820 days.

(21) Appl. No.: 11/853,585

(22) Filed: Sep. 11, 2007

(65) Prior Publication Data
US 2008/0061925 A1   Mar. 13, 2008

(30) Foreign Application Priority Data
Sep. 13, 2006  (DE) .......................... 10 2006 042 976

(51) Int. Cl.
*B60R 25/10* (2006.01)

(52) U.S. Cl. .......... 340/426.22; 340/426.23; 340/10.41; 340/5.61; 340/5.72

(58) Field of Classification Search ............. 340/426.22, 340/426.32, 426.28, 5.6, 5.72, 457, 5.62, 340/5.61, 10.3, 426.2, 10.1, 10.333
See application file for complete search history.

(56) References Cited

U.S. PATENT DOCUMENTS

| | | | | |
|---|---|---|---|---|
| 4,670,746 A * | 6/1987 | Taniguchi et al. | ............ | 340/5.62 |
| 5,287,111 A * | 2/1994 | Shpater | ............ | 342/28 |
| 5,723,911 A | 3/1998 | Glehr | ............ | 307/10.2 |
| 5,969,597 A | 10/1999 | Weigl et al. | ............ | 340/426 |
| 6,218,932 B1 | 4/2001 | Stippler | ............ | 340/426 |
| 6,359,348 B1 * | 3/2002 | King | ............ | 307/10.1 |
| 6,437,683 B1 | 8/2002 | Wolf et al. | ............ | 340/5.61 |
| 6,441,512 B1 | 8/2002 | Jakel et al. | ............ | 307/10.2 |
| 6,617,961 B1 | 9/2003 | Janssen et al. | ............ | 340/5.8 |
| 6,670,883 B1 | 12/2003 | Asakura et al. | ............ | 340/5.61 |
| 6,924,735 B2 * | 8/2005 | Ueda et al. | ............ | 340/426.28 |
| 6,924,738 B2 | 8/2005 | Emmerling et al. | ......... | 340/505 |
| 6,950,008 B2 | 9/2005 | Hagl et al. | ............ | 340/5.61 |
| 6,963,268 B2 * | 11/2005 | Brillon | ............ | 340/5.72 |
| 6,998,958 B2 | 2/2006 | Asakura et al. | ............ | 340/5.61 |
| 7,301,467 B2 | 11/2007 | Ishimura et al. | ............ | 340/644 |
| 7,446,658 B2 * | 11/2008 | Panotopoulos | ............ | 340/539.3 |
| 2002/0027498 A1 | 3/2002 | Stephane | ............ | 340/425.5 |
| 2005/0285724 A1 | 12/2005 | Schmidt et al. | ......... | 340/426.16 |
| 2006/0214768 A1 | 9/2006 | Hermann | ............ | 340/5.61 |

(Continued)

FOREIGN PATENT DOCUMENTS

DE            4409167            3/1994
(Continued)

*Primary Examiner* — Benjamin C Lee
*Assistant Examiner* — Peter Mehravari
(74) *Attorney, Agent, or Firm* — King & Spalding L.L.P.

(57) ABSTRACT

An access arrangement for a vehicle (FZ) has a transmit/receive device on the vehicle side (19) to transmit one or several interrogation signals. In addition, the access arrangement has a mobile identification generator (IDI, IDA) with a transmit/receive device on the identification generator side (SE) to receive interrogation signals from the transmit/receive device on the vehicle side and to evaluate signal characteristics of the interrogation signals at at least two different points in time. The mobile identification generator furthermore has a control device (ST) to output a different control command depending on a change (ΔFS, ΔFR) in the evaluated signal characteristics. In the event of no change or a small change in the signal characteristics, a signal may be output to deactivate the identification generator, while in the event of a marked change a locking signal to lock a door (TFZ) of the vehicle may be output.

20 Claims, 3 Drawing Sheets

U.S. PATENT DOCUMENTS

2008/0186136 A1 * 8/2008 Raphaeli et al. ............ 340/10.1

FOREIGN PATENT DOCUMENTS

| | | |
|---|---|---|
| DE | 19826904 | 6/1998 |
| DE | 19735658 C1 | 7/1998 |
| DE | 19836957 | 8/1998 |
| DE | 19845649 | 10/1998 |
| DE | 19900415 | 1/1999 |
| DE | 10064141 | 12/2000 |
| DE | 19939550 A1 | 3/2001 |
| DE | 19941849 A1 | 4/2001 |
| DE | 10202330 | 1/2002 |
| DE | 10221427 | 5/2002 |
| DE | 10056864 A1 | 6/2002 |
| DE | 10064441 A1 | 6/2002 |
| DE | 10148830 | 4/2003 |
| DE | 10353589 A1 | 6/2004 |
| DE | 102004039835 | 8/2004 |
| DE | 10334624 A1 | 3/2005 |
| DE | 102004036920 A1 | 3/2005 |
| DE | 102005032402 | 7/2005 |
| DE | 60013201 T2 | 9/2005 |
| DE | 102005013008 A1 | 10/2005 |
| DE | 102005028677 | 12/2005 |
| DE | 102005013910 | 3/2006 |
| EP | 1510835 | 8/2004 |

* cited by examiner

ACCESS ARRANGEMENT FOR A VEHICLE

CROSS-REFERENCE TO RELATED APPLICATIONS

This application claims priority to German Patent Application Number 10 2006 042 976.1 filed on Sep. 13, 2006, and which is incorporated herein by reference in its entirety.

TECHNICAL FIELD

The present invention relates to an access arrangement or an identification arrangement for a vehicle as well as a method to operate such an arrangement.

BACKGROUND

In present-day vehicles or motor vehicles an increasing number of electronic access authorization systems are provided, where the access authorization query is initiated via a remote control. In the simplest case this access authorization system consists of one or several electronically controllable locks, a controlling means and at least one corresponding electronic key, namely the remote control.

Modern and future access authorization systems or access arrangements in motor vehicles use electronic security systems, for example making use of transponder technology. Before the opening or starting of the motor vehicle, a wireless data communication first occurs for this purpose between a transceiver disposed in the motor vehicle and a transponder disposed for example in a key or a key fob of the user of the motor vehicle, where encoded data are exchanged, which ensure a valid access authorization, for example by the motor vehicle owner. One such access authorization system is for example the PASE system developed and sold by the company Siemens VDO, where PASE stands for "Passive Access Start and Entry". Here, an access authorization query is initiated for example by the operating of a door handle or merely by the approaching of the motor vehicle. Since it is not necessary to perform an active operating of a mechanical or electronic key, this type of access authorization is also referred to as passive access authorization query, the corresponding locking systems as passive electronic access authorization systems.

Occasionally, there is a requirement to retrofit exactly such a passive access authorization system to an existing keyless electronic access authorization system, which does not incorporate a passive access authorization system like the previously mentioned PASE system. In the case of known systems, in order to retrofit a passive access authorization system a transmitter must be provided on the vehicle side, especially in at least one vehicle door, said transmitter cyclically searching for the electronic key for the passive access authorization system (PASE key). Furthermore, a corresponding receiver must be disposed on the vehicle side, said receiver being electrically coupled to the central locking of the existing system and sending a corresponding control signal to the central locking, to which it is electronically coupled, after a positive evaluation of the data communication with the PASE key. Such a retrofittable passive access authorization system is known for example from DE 10 2004 039 835 B3.

The cited document contains a description of how a vehicle user may obtain access to the vehicle retrofitted with a passive access authorization system. However, the aspect as to what happens if the vehicle user leaves the vehicle, for example after depositing the vehicle, is not highlighted here. On the one hand, it might happen that an electronic key for the passive access is left behind in the vehicle, while a signal to lock the vehicle is given by means of a second key due to the actuation of a locking button. It is also conceivable that a locking of the vehicle is performed by a different mechanism. With conventional passive access authorization systems, a special locking signal substantially limited to the interior or a deactivation signal is sent for the deactivation of such electronic keys left behind in the vehicle in order to lock or deactivate the electronic keys remaining in the vehicle at least for a specific time. With a retrofitted passive access authorization system, as already hinted at briefly above, the retrofitted transmission unit on the vehicle side for the cyclical transmission of query signals to the electronic key is provided especially in a vehicle door. Due to this it is therefore difficult to transmit a locking signal substantially limited to the interior without unintentionally locking or deactivating electronic keys located outside the vehicle.

SUMMARY

An especially retrofittable access arrangement or a method to operate such an arrangement, with improved security can be created, for example, by an access arrangement for a vehicle, comprising a transmit/receive device on the vehicle side to transmit one or several interrogation signals; at least one mobile identification generator comprising: a transmit/receive device on the identification generator side to receive interrogation signals from the transmit/receive device on the vehicle side, and to evaluate signal characteristics of the one or the several interrogation signals at at least two different points in time; and a control device on the identification generator side to output a different control command depending on a change with respect to the signal characteristics evaluated at at least two different points in time.

According to an enhancement, the access arrangement may furthermore comprise a door sensor to detect an open or closed state of at least one door of the vehicle, where the transmit/receive device on the vehicle side transmits the one or the several interrogation signals when a closed door state is detected by the door sensor. According to a further enhancement, the transmit/receive device on the vehicle side can be furthermore designed to receive a locking signal for the locking of at least one door of the vehicle, with the transmit/receive device on the vehicle side transmitting the one or the several interrogation signals in response to the receipt of the locking signal. According to a further enhancement, the control device on the identification generator side may output a deactivation signal to deactivate the at least one mobile identification generator, especially the transmit/receive device on the identification generator side, in the event of a change with respect to the signal characteristics evaluated at at least two different points in time smaller than or equal to a predetermined threshold value. According to a further enhancement, the control device on the identification generator side may output a locking signal to lock at least one door of the vehicle in the event of a change with respect to the signal characteristics evaluated at at least two different points in time larger than a predetermined threshold value. According to a further enhancement, the transmission of interrogation signals may be limited to a specific time segment or to a specific number of interrogation signals. According to a further enhancement, the transmission of the interrogation signals may occur in periodically recurring time intervals. According to a further enhancement, the mobile identification generator furthermore may comprise an actuation element for actuation by a user, through the actuation whereof the at least one mobile identification generator, especially its deactivated transmit/ receive device on the identification generator side, is reactivated. According to a further enhancement, a mobile identification generator, which has sent a locking signal to lock the vehicle, may not receive or evaluate any interrogation signals for a specific period of time. According to a further enhancement, the signal characteristics may include field strength and/or field direction. According to a further enhancement, the interrogation signals transmitted by the transmit/receive device on the vehicle side may have identical and/or constant signal characteristics. According to a further enhancement, According to another embodiment, a method to operate an access arrangement for a vehicle, may comprise the steps of: Transmitting one or several interrogation signals by the vehicle; Receiving the interrogation signals and evaluating signal characteristics of the one or the several interrogation signals at at least two different points in time by at least one mobile identification generator; and Outputting a different control command by the at least one mobile identification generator depending on a change with respect to the signal characteristics evaluated at at least two different points in time.

According to an enhancement, in the first instance a closed state of at least one door of the vehicle may be detected and the one or the several interrogation signals can then be transmitted on the part of the vehicle, if a closed door state was detected. According to a further enhancement, in the first instance a locking signal may be received by the vehicle and in response to the locking signal the one or the several interrogation signals may then be transmitted on the part of the vehicle. According to a further enhancement, the mobile identification generator may output a locking signal to lock the at least one door of the vehicle in the event of a change with respect to the signal characteristics of the at least two evaluated interrogation signals greater than a predetermined threshold value. According to a further enhancement, the mobile identification generator may output a deactivation signal to deactivate the mobile identification generator in the event of a change with respect to the signal characteristics of the at least two evaluated interrogation signals smaller than or equal to a predetermined threshold value. According to a further enhancement, the mobile identification generator furthermore may comprise an actuation element for actuation by a user, through the actuation whereof the deactivated mobile identification generator may be reactivated. According to a further enhancement, the interrogation signals transmitted on the part of the vehicle may have identical and/or constant signal characteristics.

BRIEF DESCRIPTION OF THE DRAWINGS

Below, exemplary embodiments of the present invention will now be described in greater detail with reference to the accompanying drawings.

DETAILED DESCRIPTION

According to various embodiments, an access arrangement or an identification arrangement for a vehicle, whereby especially the access to the vehicle can be controlled, comprises the following characteristics. A transmit/receive device on the vehicle side is provided for the transmission of one or several signals or interrogation signals on the vehicle side. The transmit/receive device on the vehicle side is designed especially for transmitting interrogation signals with identical signal characteristics, such as for example with identical field strength and/or identical field direction. Furthermore the signal characteristics may also remain identical within an interrogation signal transmitted especially over a longer period of time (for example in a range of one to several seconds). In addition, the access arrangement comprises at least one mobile identification generator or a portable user identification device with a transmit/receive device on the identification generator side for the receiving of interrogation signals from the transmit/receive device on the vehicle side and for the evaluation of signal characteristics especially of the one or the several interrogation signals at at least two different points in time. It is possible in this regard that at least two evaluations or measurements of the signal characteristics are performed especially for an interrogation signal transmitted over a longer period of time (for example in the range of one to several seconds) or that the signal characteristics of several or at least two of the received interrogation signals are evaluated or measured. The at least one mobile identification generator moreover has a control device on the identification generator side for the output of a different control command depending on a change with respect to the signal characteristics evaluated or measured at at least two different points in time. On the basis of the evaluation of the signal characteristics at the at least two different points in time, it is therefore possible for the control device on the identification generator side to evaluate whether the mobile identification generator is moving (change in the measured or evaluated signal characteristics), for example because the motor vehicle user carries it away from the vehicle while moving away, or is not moving (minimal or no change whatsoever in the measured or evaluated signal characteristics), because it has for example been forgotten by the motor vehicle user in the vehicle or the passenger compartment. In other words, in case interrogation signals are sent out with signal characteristics that are identical or constant over time, the measured signal characteristics (such as field strength or field direction) at a specific location will also remain identical at least on average. Consequently an identification generator that is stationary or was forgotten in the vehicle will not recognize a change in signal characteristics at least on average when measuring interrogation signals, while an identification generator moving with the motor vehicle user detects a change in the measured signal characteristics. Corresponding to a change in the signal characteristics the control device on the identification generator side may output a different control command, which on the one hand is executed in the mobile identification generator itself or after transmission via the transmit/receive device on the identification generator side to the vehicle can be executed there. Consequently the monitoring of the signal characteristics of the interrogation signals and the corresponding transmission of a specific control command allow necessary safety measures to be executed to improve the safety of the access arrangement.

It is possible that a trigger device is provided for the triggering of the transmission of the one or the several signals or interrogation signals on the vehicle side by the transmit/receive device on the vehicle side. Said trigger device is designed so as to detect a triggering event, such as a trigger signal or a trigger state, and in response thereto cause the transmit/receive device on the vehicle side to transmit the one or the several interrogation signals.

The trigger device may for example comprise a door sensor as triggering event, said sensor serving to detect a closure state or an open or closed state of at least one door of the vehicle. A closed door state detected by the door sensor may serve as a trigger signal or as a trigger state (trigger) so that in response to the detected closed door state the transmit/receive device on the vehicle side is caused to transmit the interrogation signals. It is furthermore conceivable to determine as a criterion for the transmission of the one or the several query signals that first an open and then a closed door state is detected. This can occur if a vehicle user opens the driver door at the destination in order to get out and then closes it again after having got out. A further additional or alternative criterion (triggering event) for the transmission of the plurality of interrogation signals apart from the detection of a closed or first open and then closed state may be that a locking state of the at least one door of the vehicle is detected, where the one or the several interrogation signals are begun to be transmitted when a locked state of the at least one door is detected. For the interrogating of the locking state of the door the trigger device may comprise a locking device allocated to at least one door of the vehicle. In addition a further additional or alternative criterion apart from the mentioned criteria may be that an operating state of the engine or of the combustion engine is detected, where the transmitting of the one or the several interrogation signals is begun when the engine is switched off or is in a deactivated state. To detect the operating state of the engine or of the combustion engine the trigger device may also comprise an engine sensor.

It is, however, also possible that the trigger device incorporates the transmit/receive device on the vehicle side itself, which is designed to receive a locking signal to lock at least one door of the vehicle as triggering event, the transmit/receive device on the vehicle side emitting the one or the several interrogation signals in response to the receipt of the locking signal. Said locking signal may originate from any remote control designed to output locking signals (advantageously also to output unlocking signals). It is especially conceivable that a mobile identification generator transmits the locking signal (for example in response to the pressing of a button by a user). The advantage for the transmission of the interrogation signals in response to the receipt of a locking signal may exist in the following case. The access arrangement comprises at least a first and a second mobile identification generator. While the first mobile identification generator is carried along by a user moving away from the vehicle after a depositing or parking of the vehicle, the second mobile identification generator was forgotten in the vehicle. If the user or the first mobile identification encoder of said user now sends a locking signal to the vehicle for example by pressing a button provided for this purpose on the first mobile identification generator, one door or all doors of the vehicle are locked and the vehicle starts transmitting the interrogation signals. These are received by the second mobile identification generator forgotten in the interior so that it may execute a corresponding control command, especially a deactivation (see below for more details), since its position and therefore the measured signal characteristics do not change. Although the vehicle is therefore "actively" locked, the transmission of the interrogation signals occurs additionally in the mentioned case in order to ensure a deactivation of identification generators left behind in the vehicle.

According to one embodiment, the control device on the identification generator side is designed to output a deactivation signal to deactivate the mobile identification generator, especially the transmit/receive device on the identification generator side, in the event of a change with respect to the signal characteristics evaluated at the at least two different points in time smaller than or equal to a predetermined threshold value. This means that if the change with respect to the signal characteristics evaluated at the at least two different points in time is so small that it is to be assumed that the mobile identification generator has remained in the same location during the time interval between the at least two measurements or evaluations of the signal characteristics, for example because it was forgotten in the vehicle interior, the control device on the identification generator side determines a deactivation of the mobile identification generator or merely of the transmit/receive device on the identification generator side so that the mobile identification generator is no longer capable at least for a specific period of time of performing an authentication with the transmit/receive device on the vehicle side (in order to facilitate a possible unlocking of a vehicle door). A deactivation of the mobile identification generator may for example occur through the interruption of the current supply from an energy source of the identification generator to the electronic components thereof. In order to then reactivate a deactivated mobile identification generator or the deactivated transmit/receive device thereof the mobile identification generator may comprise an actuation element for example in the form of a button, the actuation of which by a user or motor vehicle user will effect an activation of the mobile identification generator or the transmit/receive device thereof. As opposed to conventional access systems, a deactivation of a mobile identification generator therefore does not occur from the outside through a locking signal of a transmit/receive device on the vehicle side but through the analyzing of signal characteristics at different points in time by the mobile identification generator itself. Correspondingly, a renewed activation may once again be effected directly on the mobile identification generator itself.

According to a further embodiment, the control device on the identification generator side is designed to output a locking signal to lock the door of the vehicle in the event of a change with respect to the signal characteristics evaluated at the at least two different points in time greater than a predetermined threshold value. This means that if the control device on the identification generator side detects that a significant change has occurred in the signal characteristics evaluated at the at least two different points in time, said control device may conclude that the mobile identification generator is moving, for example because it is provided in a pocket or bag of the vehicle user, and moving away from the vehicle with the vehicle user. In this case the vehicle user no longer needs to take care of locking his or her vehicle himself or herself, but this task is assumed by the mobile identification generator by said generator detecting a significant change in the signal characteristics of the one or the several interrogation signals after evaluating said signal characteristics and for example sending the locking signal via the transmit/receive device on the identification generator side to the transmit/receive device on the vehicle side, which forwards the locking signal (possibly via a control device on the vehicle side) to a locking device for the locking of the at least one door. Said locking device may be an individual or specific electronically controllable lock or may be realized as the central locking of the vehicle. It should be noted that as criterion for the transmission of the locking signal by the mobile identification generator a reduction of the received field strength from a first to a second query signal is furthermore detected in addition to a determination of a change in signal characteristics.

According to a further embodiment, the transmission of the interrogation signals occurs (after the presence of one or several predetermined criteria such as the detection of the closed state of the at least one door) in specific or periodically recurring time intervals. Such time intervals may amount to from one to several seconds, especially 5 seconds (s), to detect a significant signal characteristics change in the event of a movement of the mobile identification generator. As already mentioned, the transmission of the interrogation signals occurs after one or several predetermined criteria. It may also be stopped again after one or several predetermined criteria. Said transmission of the query signals may be limited to a predetermined time segment, of 30 s for example, or to a predetermined number of query signals, for example two to six interrogation signals. In addition, the receipt of a locking signal from the mobile identification generator may be a criterion to stop the transmission of the query signals. For the sake of completeness, the case should also be mentioned where for example after the leaving of the vehicle by the vehicle user and locking of the at least one vehicle door one mobile identification generator has been left behind in the vehicle interior while a further mobile identification generator is moving away from the vehicle with the vehicle user. Assuming a mobile identification generator that is also capable of actively transmitting a locking signal through an actuation on the part of the motor vehicle user (as in the case of a retrofitted passive access system), it is possible in this scenario that the actively transmitted locking signal is received for example by the transmit/receive device on the vehicle side even before one or several (especially several) interrogation signals have been transmitted. In this case the transmit/receive device on the vehicle side may advantageously transmit one or several (especially several) interrogation signals in spite of the receipt of the locking signal so that a mobile identification generator left behind in the vehicle interior also has the possibility of detecting a change with respect to the signal characteristics at different points in time of the one or the several interrogation signals and of deactivating itself where appropriate.

According to a further embodiment, the signal characteristics, which are evaluated by the control device on the identification generator side, comprise the field strength and/or field direction of the interrogation signals transmitted by the transmit/receive device on the vehicle side. Especially for the detection of the field direction the transmit/receive device on the identification generator side may have a three-dimensional antenna structure allowing three-dimensional field vectors of interrogation signals (in the form of radio signals) to be detected.

According to a further embodiment, a method for operating an access arrangement for a vehicle is created comprises the following steps. One or several interrogation signals are transmitted by the vehicle. This transmission of the interrogation signals may be triggered or caused by the detection of a triggering event, such as a trigger signal or a trigger state. For example the detection of the locking state of at least one door of the vehicle may cause the transmission of the query signals. Eventually, the transmitted query signals are received and evaluated with respect to the signal characteristics by a mobile identification generator. Subsequently, a corresponding different control command is output by the mobile identification generator depending on a change with respect to the signal characteristics evaluated at at least two different points in time. On the basis of the evaluation of the signal characteristics at at least two different points in time, the mobile identification generator is therefore capable of determining whether it is moving away from the vehicle for example with a motor vehicle user or is still located in the vehicle and was left behind there. Correspondingly, said mobile identification generator may initiate safety-relevant measures by transmitting different control commands.

Various embodiments of the above-described arrangement are also to be considered embodiments of the method, insofar as they are incidentally transferable to the method.

Figure 1:
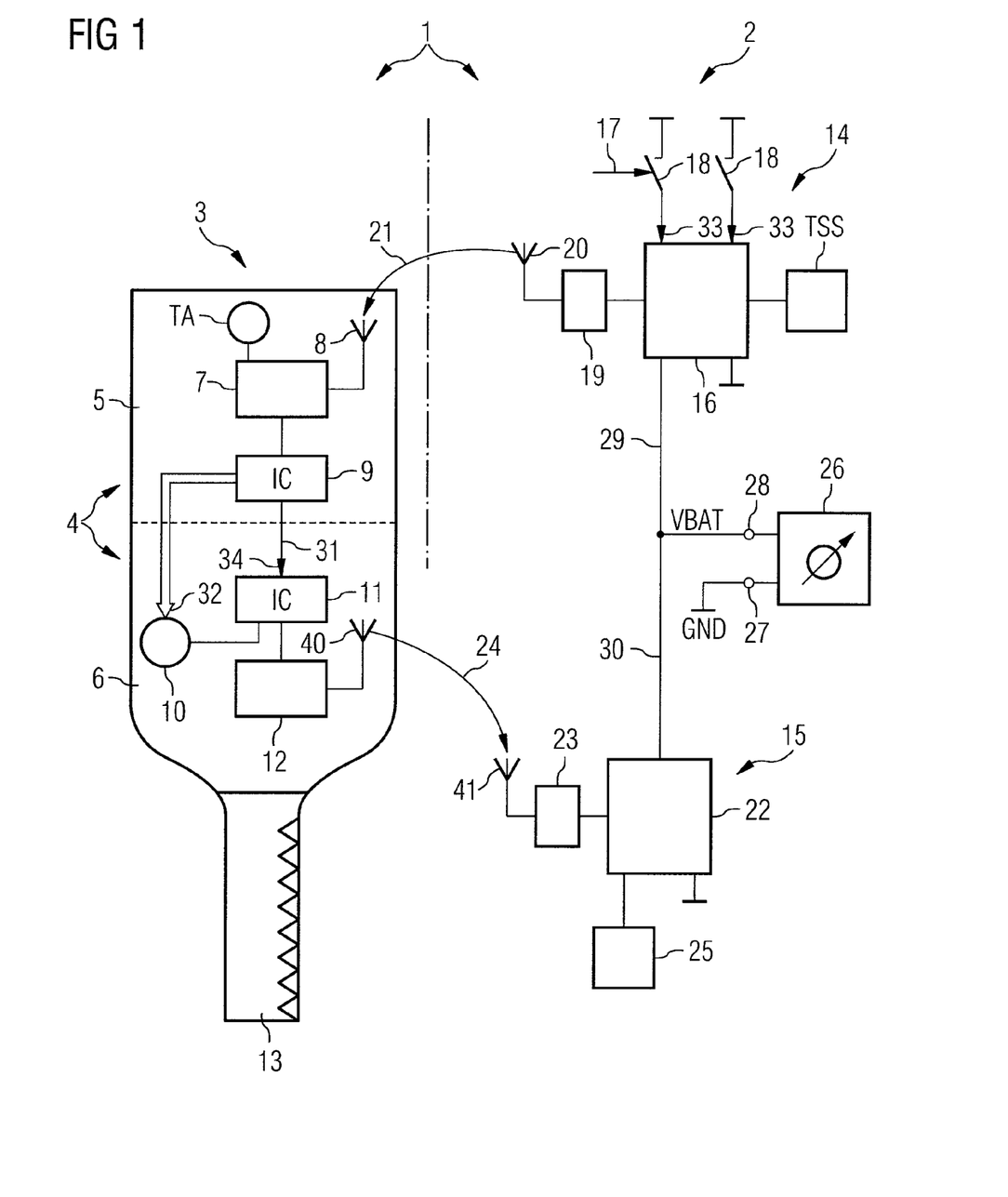
FIG. 1 shows a block diagram of a keyless electronic access authorization system or of an access arrangement according to an embodiment.

In the first instance, reference is made to FIG. 1, in which an access authorization system or an access arrangement 1, designed for use in a motor vehicle in this case, is represented. The access authorization system 1 comprises a stationary region 2 on the vehicle side as well as a mobile region 3 on the key side.

In the mobile region 3, a mobile identification generator in the form of an electronic key 4 is provided. The electronic key 4 comprises two key regions 5 and 6. The first key region 5 comprises a transponder not represented in detail and is designed for a passive access system, such as a PASE system for example. Furthermore, the first key region 5 comprises a receiving device 7, which has an inductive antenna or receiving antenna 8, as well as a control and evaluation circuit 9 connected to the receiving device 7. The second key region 6 comprises a remote control function (RKE Remote Keyless Entry) for the remotely controlled unlocking and locking of one or several door locks. Typically, but not necessarily, the remote control is operated at frequencies in a range of around 447 MHz. The remote control may have several switch positions to differentiate for example whether only the driver door, all doors, the trunk door, etc. are to be opened or whether said doors are to be closed or locked.

The remote control comprises at least one remote control button not represented in FIG. 1 coupled in the known manner with a corresponding sensor 10, for example a capacitive sensor, a pressure sensor or similar. The sensor 10 for its part is coupled via a connection lead to a control and evaluation device 11 connected to a transmission device 12. The evaluation and control circuits 9, 11 in the key 4 may, for example, be designed as programmable logic circuits, for example as PLD or as FPGA circuits or also as simple microprocessors.

In addition, the electronic key 4 also has a mechanical key region 13, which is equipped with a key bit 13 for the mechanical opening of a door lock. In addition, a button TA is provided whose function will be explained below with reference to FIGS. 2 and 3 respectively.

The stationary region 2 on the vehicle side comprises a passive electronic access authorization system 14 (or passive access system for short) as well as an active electronic access authorization system 15 (or active access system for short). The passive access system 14, here in the form of a retrofitted system, may be provided in a door of the vehicle (see also FIG. 2) and comprises a control unit 16. For picking up passive access authorization queries 17, the control unit 16 is connected to switches or sensors 18 specifically provided for this purpose. Said switches 18 may for example be disposed in a door handle. Suitable as sensor could preferably be a capacitive sensor or also an optical sensor, for example a light barrier. The control unit 16 is furthermore connected to a transmission device 19, which is itself connected to at least one inductive antenna or transmission antenna 20. The range of the inductive antenna 20 is typically restricted to approximately 1-2 m around the vehicle door for the checking of an access authorization, but said antenna may also have a larger range of several meters for scenarios where the motor vehicle user leaves the vehicle (see also the description for FIGS. 2 and 3). When using the passive access system 14, a preferably undirectional data communication could be established between the base station on the vehicle side and the transponder in the first key region by means of the transmission device 19 and respectively the receiving device 7 on the vehicle side and the key side, the corresponding communication path between the corresponding antennas 8, 20 being marked with reference number 21 in FIG. 1. Said data communication 21 may occur preferably by means of high-frequency electromagnetic waves, which can be preferably—but not necessarily—secured cryptologically or by means of a fixed code to improve the data security. In the case of data communication secured cryptologically or by means of a fixed code, said data communication preferably may occur bidirectionally, in which case the respective antennas 8, 20 must be embodied as transmit/receive antennas, the corresponding elements 7, 19 as transmit/receive devices (transceivers).

The active access system 15 comprises a control unit 22, for example the control unit 22 of a central locking system, said control unit being controllable via the remote control. For this purpose the control unit 22 is connected to a receiver 23. Via a transmitter 12 as well as an antenna 40 in the second key region 6 and a receiver 23 as well as an antenna 41 in the active access system 15, a communication connection marked by reference number 24 can be embodied. The control unit 22 is connected to at least one lock 25, for example a door lock of a fuel filler flap, a trunk lid or similar.

In addition, a supply voltage source 26 is provided. In the case of a motor vehicle, the supply voltage source 26 is embodied as a car battery that delivers a DC voltage on the output side. The supply voltage source 26 has two supply outputs 27, 28. The first supply output 27 has the potential GND of the reference ground. The second supply connection 28 supplies a battery potential VBAT. The first control unit 16 and the second control unit 22 are each connected to a second supply connection 28 via two supply leads 29, 30 so that each said control unit is supplied with the battery potential VBAT. Furthermore, the two control units 16, 22 are also connected to the potential GND of the reference ground.

The control and evaluation circuit 9 in the first key region 5 is connected to the corresponding control and evaluation circuit 11 in the second key region via an electrical connection lead 31. Additionally or alternatively, it can also be provided that the control and evaluation circuit 9 is coupled with the corresponding sensor 10 in the second key region 6 via a mechanical actuation device. In this way a mechanical pressure on sensor 10 may be simulated under the control of the control and evaluation circuit 9, as indicated by connection 32 in FIG. 1.

As already briefly indicated, the first key region 5 as well as the passive access system 14 has been retrofitted in the access authorization system 1. This means that the original access authorization system 1 merely contained an electronic key 4 comprising the second key region 6 as well as the active access system 15. By coupling the passive access system 14 to the battery 26 as well as coupling the first key region 5 to the electronic key 4, a retrofitting of the access authorization system can be effected in a very simple and elegant manner.

Below, the operation of the (retrofitted) access authorization system 1 according to FIG. 1 will be described for the case where a user or a motor vehicle user wishes to obtain access to his or her vehicle. Initially, only the case will be considered where a passive access authorization query is effected.

In the case of a passive access authorization query, for example in the event that the motor vehicle user approaches the motor vehicle, at least one of the switches 18 is actuated or a corresponding sensor 18 responds. Said switch 18 or the sensor 18 generates a sensor signal 33, which is evaluated by the control unit 16. In the event of a positive evaluation of the sensor signal 33, a first data communication 21 occurs. Thereby cryptological data are exchanged between the passive access system 14 and the transponder in the first key region 5 in order to determine whether an authorized access authorization query 17 is present. An authorized access authorization query 17 is present if a motor vehicle user equipped with the correct key approaches said vehicle. This is determined in the control and evaluation circuit 9 in the transponder as well as in the control unit 16. In the event of a positive evaluation of an authorized access authorization query 17, the control and evaluation circuit 9 generates a control signal 34 that is fed to the control and evaluation circuit 11 in the second key region 6. Said control signal 34 simulates an active access authorization query, corresponding to a signal from the sensor 10 after the actuation thereof. Via the transmitter 12 or the antenna 40, an access control signal is then sent by means of the second data communication 24 to the reception device 23 of the active access authorization system 15. The second control unit 22 now interprets this as an active access authorization query although it was a case of a passive access authorization query. The control unit 22 now controls the lock (or also the locks of a central locking system) correspondingly, whereby this lock 25 is unlocked (or locked, as will yet be described below). The unlocking or locking operation on the vehicle side does not therefore differ from the previous remotely controlled unlocking operation with manual actuation of the remote control button in key 4.

The represented access authorization system 1 of course also works if the user actuates the remote control on the electronic key, when therefore an actual active access authorization query is present. In this case a direct data communication 24 to the active access system 15 occurs merely making use of the elements of the second key region 6. In addition, the lock 25 may also be unlocked and/or locked via the key bit 13.

Figure 2:
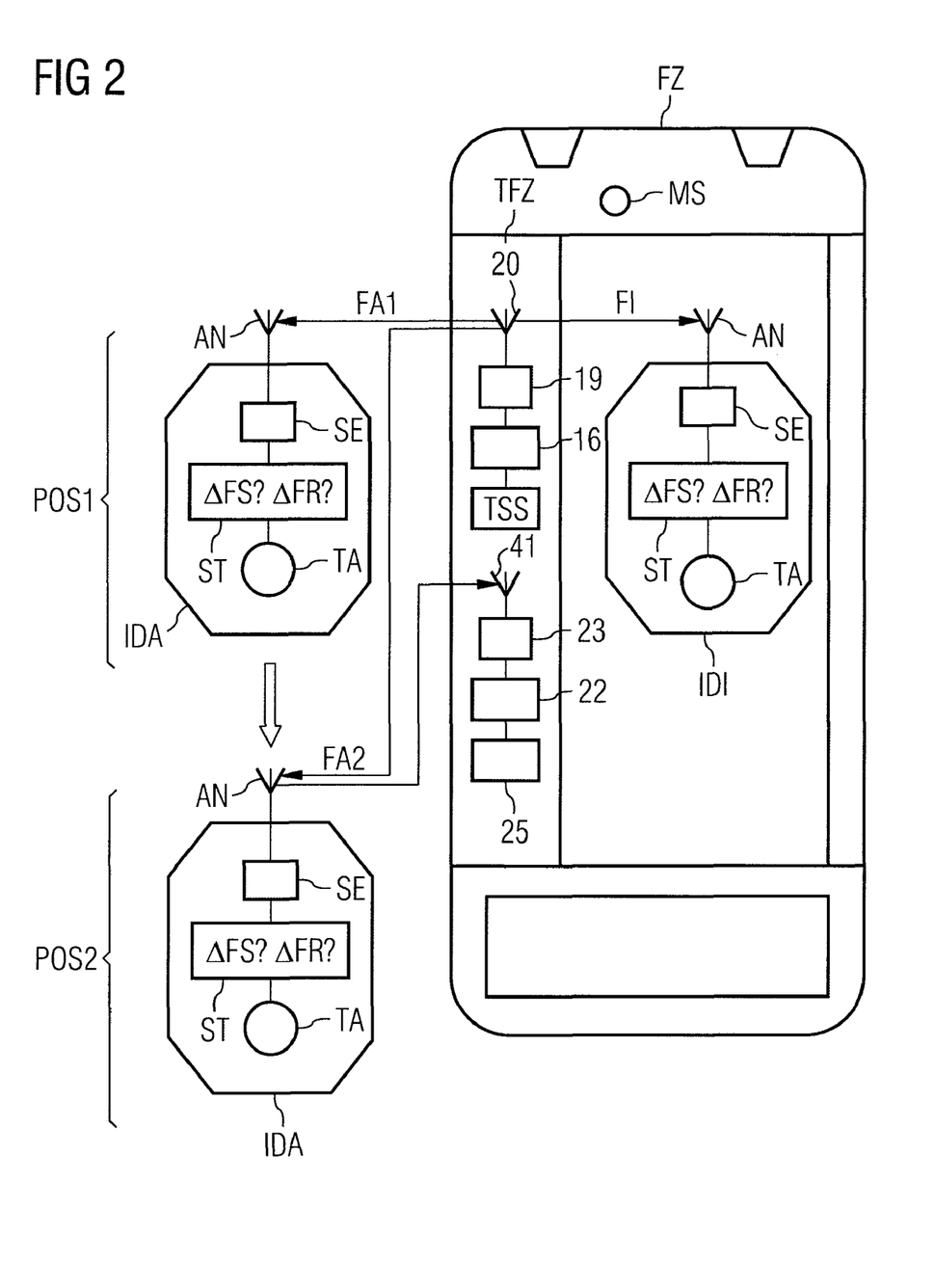
FIG. 2 shows a schematic representation of a scenario in which a motor vehicle user leaves the vehicle, where on the one hand a mobile identification generator was left behind in the vehicle interior or on the other hand taken along by the driver.
Figure 3:
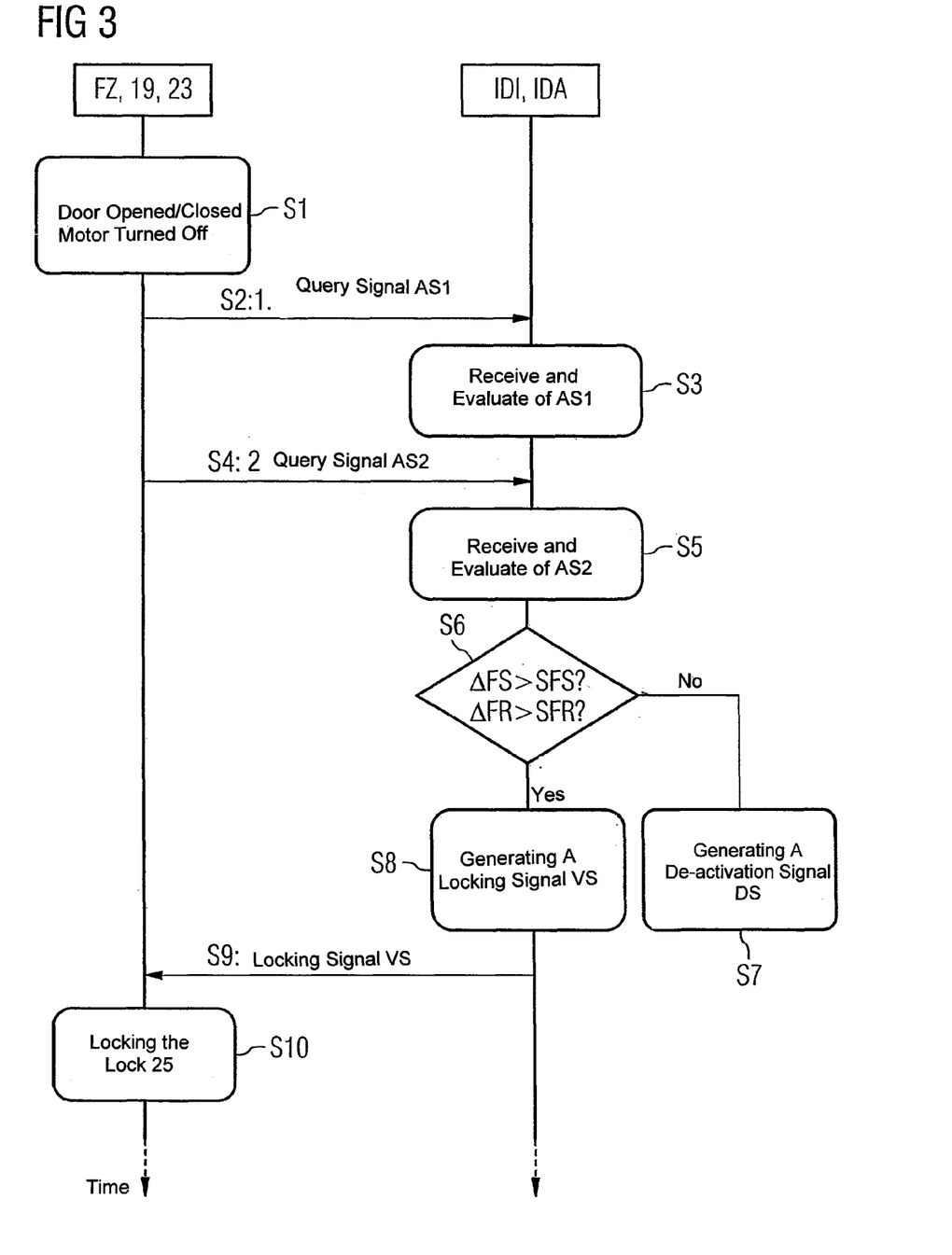
FIG. 3 shows a flow chart of the individual operations, which are performed both in the vehicle and in an allocated identification generator when the motor vehicle user leaves his or her vehicle.

After the case where a motor vehicle user attempts to gain access to his or her vehicle having been explained with reference to FIG. 1, now the case will be considered where a motor vehicle user wishes to leave his or her vehicle for example after depositing or parking it, making reference to FIGS. 2 and 3 respectively. For this purpose a top view onto a vehicle FZ is represented in FIG. 2, said vehicle having a vehicle door TFZ (not represented true to scale but slightly magnified here), in which some components of the stationary region 2 on the vehicle side from FIG. 1 are accommodated. But it is also possible here that the components (41, 22, 23) of the active access system are provided at a different location of the vehicle FZ. Although the switch or switches 18 may also be provided in the vehicle door, they are not shown in the representation of FIG. 2, since they are not required for the following description.

In addition to the vehicle FZ, FIG. 2 represents a mobile identification generator or electronic key, with an electronic key IDI being located inside the vehicle, for example in the passenger compartment, and a further electronic key IDA being located outside the vehicle FZ, where it is indicated that the electronic key IDA located outside is moving from a first position POS1 to a second Position POS2. The respective electronic keys IDI and IDA both have the same structure (corresponding to key 4), with only the most important components being represented schematically for reasons of representational clarity. In this configuration an electronic key IDI or IDA has an antenna AN (for example representative of antennas 8, 40 of the key 4), a transmit/receive device SE (combined for or representative of the receiving device 7 and the transmission device 12 of the key 4) as well as a control unit ST (on the identification generator side) (combined for or representative of the control and evaluation circuits 9, 11 of the key 4). It should be noted that the antenna AN may have a three-dimensional structure so that changes with respect to the field direction of received interrogation signals are detectable. In addition, an electronic key IDI or IDA has a button TA, which may be actuated by a motor vehicle user and is in connection with the control device ST. The meaning of said button TA will be explained in more detail below.

Now the case will be considered where a motor vehicle user wishes to leave his or her vehicle FZ after depositing or parking it, with an electronic key IDI still remaining in the vehicle interior on the one hand while a further electronic key IDA is taken along by the motor vehicle user and moving with respect to the vehicle or moving away from the vehicle FZ. The electronic key IDI may for example have been left behind accidentally on a seat by a passenger, who is also in possession of an electronic key for the access authorization system of the vehicle FZ. A possible course of events when the motor vehicle user leaves the vehicle in this scenario is shown in FIG. 3 according to one exemplary embodiment.

When a motor vehicle user wishes to leave his or her vehicle FZ, he or she will first open a door TFZ of his or her vehicle FZ, get out of the vehicle and close the door TFZ again. Therefore the detection of a closed door state may act in step S1 as the first criterion (or as triggering event) for the initiation of further steps. It is also conceivable that the detection of initially an open door state and then a closed door state may be a criterion. A respective door state may be detected by a door closure sensor TSS connected to the control unit 16. Furthermore, it is possible to check as a further criterion for the initiation of subsequent steps whether the engine or the combustion engine of the vehicle is switched off, which can be assessed as an indication of a depositing or parking of the vehicle. For this purpose the vehicle has an engine sensor MS, which (although it is not represented) is also connected to the control unit 16.

If a closed door state or an open and then closed door state has been detected by the control unit 16 via the respective sensors TSS and a switched-off engine state by the sensor MS (a triggering event may therefore comprise the presence of one or several criteria), the control unit 16 will then begin to cause the transmission of a plurality of interrogation signals or query signals here in the example with identical signal characteristics (for example with identical field strength and/or identical field direction) by the transmission device 19 via the antenna 20. The query signals are transmitted at a time interval of several seconds, for example 5 s. Although only two interrogation signals AS1 and AS2 transmitted by the transmission device 19 are represented in FIG. 3, it is also conceivable to transmit more than these two interrogation signals.

Now reference will be made once more to FIG. 3, in which, according to the chronological sequence, the first interrogation signal AS1 is transmitted in step S2, said signal then being received or evaluated with respect to the signal characteristics, such as for example field strength and/or field direction, by the two electronic keys IDI and IDA in step S3. Correspondingly, the second interrogation signal AS2, which was transmitted in step S4 by the vehicle or the transmission device 19, is also received by the two electronic keys IDI, IDA and evaluated with respect to the signal characteristics in step S5. Although it is also possible merely to analyze one specific signal characteristic with respect to the change therein, in the text below there are always several signal characteristics, such as the field strength and the field direction of the interrogation signals, being analyzed.

If at least two interrogation signals were thus received and evaluated with respect to signal characteristics, a comparison will now take place in step S6 in the respective control device ST with respect to a change ΔFS with respect to the field strength as well as a change ΔFR with respect to the field direction (but it would also, as already mentioned above, be conceivable to analyze merely one of the signal characteristics). If you now assume a case where an electronic key, such as the key IDI, was forgotten in the vehicle interior, while the motor vehicle user moves away from the vehicle, the first interrogation signal AS1 and the second interrogation signal AS2 will be received by the electronic key IDI lying inside essentially with identical signal characteristics or with identical field strength or field direction. The distance FI from the antenna 20 to the antenna AN remains unchanged. Therefore the changes ΔFS or ΔFR will be very small or equal zero. To determine whether a change has occurred a respective threshold value is therefore introduced, a threshold value SFS with respect to the change in field strength as well as a threshold value SFR with respect to the change in field direction. For an electronic key IDI essentially not moving within the vehicle, the changes with respect to field strength and field direction will therefore lie below the respective threshold values SFS or SFR so that branching into the represented "No" branch will take place. In other words, the control device ST will determine for the electronic key IDI located inside that there is no change arising with respect to the field direction and field strength and therefore no movement of the key IDI and correspondingly assume that the key is located inside the vehicle. Since such a key located in the vehicle interior represents a security gap with respect to an above-described access authorization operation, the control device ST of the key IDI will now deactivate or block the key IDI in step S7. Either only the transmit/receive device SE of the key IDI may be blocked for a specific time or permanently, for example in order to prevent it from performing any further authorization operation, or the entire key IDI may be blocked or deactivated, for example by the energy supply from an energy source of the key, said source not being represented, being interrupted by means of a switch.

In this way it is possible for the key lying inside to determine itself that it is located in the interior and that it has to deactivate itself to minimize a security risk. Using the above-described button TA, a motor vehicle user can then reactivate the partially or totally blocked or deactivated key by actuating the button merely singly or according to a specific "activation pattern".

The case will now be discussed where the electronic key IDA is carried along with the motor vehicle user (for example located in his or her pocket or handbag), while the motor vehicle user gets out of the vehicle FZ and moves away from the vehicle FZ after locking the door.

When the motor vehicle user has locked the door TFZ after getting out of the vehicle FZ, the transmission of the interrogation signals is started by the transmission device 19, as already mentioned. In a first position POS1, the electronic key IDA located outside will be located at a small distance FA1 from the antenna 20, said distance possibly also corresponding for example to the distance FI of the electronic key IDI located inside. However, the electronic key IDA located outside now moves away from the vehicle FZ with the motor vehicle user so that the distance FA2 to the antenna 20 for example at position POS2 increases. Therefore the signal characteristics of a first received interrogation signal AS1 at position POS1 will differ considerably from the signal characteristics of a second interrogation signal AS2 at position POS2. Consequently, the control device ST of the electronic key IDA located outside at position POS2 will determine (see also step S6) after the evaluation of the signal characteristics, especially of the field strength and of the field direction, that the respective change in the field strength ΔFS as well as the change in the field direction ΔFR was so marked that it lies above the respective limit value SFS or SFR. On the basis of such a marked change in the signal characteristics, the electronic key IDA or the control device thereof ST may now conclude that the electronic key IDA has not been left behind (for example in the vehicle interior) but is moving or is moving away from the vehicle (with the vehicle user). On the basis of this conclusion, the control device ST will now generate a locking signal VS for example at position POS2 in step S8 and send said signal in step S9 via the transmit/receive unit SE and the antenna AN to antenna 41 of the active access system (15, see also FIG. 1). Here, the locking signal is received by the receiver 23, evaluated by the control unit 22 and finally forwarded to the lock 25 or a central locking represented by the lock 25. The lock 25 or the central locking then locks the allocated door lock or locks in step S10. Therefore a high level of security may also be achieved in the case of the retrofitted passive access authorization system according to FIGS. 1 and 2, namely by the electronic key automatically locking the vehicle if it detects a moving or moving away from the vehicle.

It should also be noted that it is possible that the just described electronic key IDA in the area outside the vehicle does not move or hardly moves over time so that a change in signal characteristics with respect to field strength or field direction lies below the respective limit value. In this case the electronic key located in the outside area will also deactivate itself. But such a deactivation may be reversed again by pressing the above-mentioned button TA.

According to an embodiment it is furthermore possible that the deactivated electronic key is reactivated when it is used (correspondingly to a remote control of an active access arrangement) to emit a locking signal by pressing a specific button of the key (see also correspondingly the remote control button connected to the sensor 10). This means that by pressing a button of the key, like a button to transmit a remote control signal (e.g. the locking signal), a deactivated key may be reactivated.

While with the just described embodiment the transmission of the interrogation signals from the transmission device 19 is started after the detection of a closed state of the door TFZ, it is also conceivable according to a further embodiment to start the transmission of the interrogation signals when a locking signal (e.g. triggered by pressing the remote control button correspondingly connected to the sensor 10) of an "active" key or a key used as remote control has been received by the receiver 23. The transmission of the interrogation signals now serves especially for enabling a key located or forgotten in the interior to deactivate itself, as described above. In order to prevent the problem here that no deactivation will however occur in the event of or after active locking, according to this further embodiment with an electronic key that is "actively" used or is transmitting the locking signal an evaluation of the signal characteristics of the subsequently received interrogation signals (interrogation signals triggered in response to locking signal) is suppressed or interrupted. In other words, the "actively" used key blanks out the received interrogation signals and therefore does not deactivate itself. This blanking out of the received interrogation signals may occur especially for a specific period of time after the transmission of the locking signal. Advantageously, this specific period of time may be chosen to be as long as the transmission of the interrogation signals (triggered by the locking signal) lasts.

Below, some advantageous realizations will be described briefly with respect to the just described embodiments of an access authorization system.

It is possible for example that the current locking state of the vehicle FZ is conveyed with one or with all interrogation signals transmitted by vehicle FZ or via the transmission device 19. Instead of the current locking state of the vehicle it is also possible for the new (intended) locking state (for example from unlocked to locked) to be conveyed in this regard. If a mobile identification generator or mobile key now knows the current locking state or the intended change in state after evaluation of the interrogation signal, it can send the corresponding signal for locking or unlocking back to the vehicle.

Furthermore, it is possible that a motor vehicle user triggers different functions (for example locking and unlocking, etc.) by actuating an actuation element in different ways. It is possible for example that an unlocking signal is transmitted directly from the mobile identification generator through a single brief actuation of the remote control button mentioned above and not represented, which is connected to the sensor 10 (FIG. 1), while with a longer actuation of the remote control button or a repeated actuation within a short time interval a locking signal will be sent from the mobile identification generator to the vehicle.

To further improve the security especially with respect to identification generators or electronic keys forgotten in the vehicle interior it is conceivable that the control unit 16 transmits or causes the transmission of a deactivation signal to deactivate or lock the identification generator located within a reception range close to the transmission device 19 (approx. 1-2 m around the transmission device 19) after the elapsing of a specific time interval after a locking of the vehicle has been determined (for example by a locking sensor connected to the control unit 16 and not represented in the figures). In this scenario the locking may for example have occurred previously due to a locking signal of a mobile identification generator located outside or for example through a mechanical locking by the motor vehicle user. It would also be conceivable in this regard that the control unit 16 transmits the deactivation signal without the transmission of the plurality of interrogation signals after a specific period of time or time interval and after the detection of a locking of at least one door of the vehicle.

If a new mobile identification generator or electronic key is to be included in the above described access authorization system, the new mobile identification generator must first be trained. If several mobile identification generators are to be trained, the problem of the several identification generators colliding with one another may arise. It is therefore suggested that when training several mobile identification generators these are trained successively or one after the other in order to avoid a collision.

What is claimed is:

1. An access arrangement for a user to control access to a vehicle, comprising:
    a transmit/receive device at the vehicle to transmit one or more interrogation signals; and
    a mobile identification generator configured to be carried by the user and comprising:
        a transmit/receive device to receive interrogation signals from the transmit/receive device at the vehicle, and
        a control device, in response to the vehicle being turned off or a closing or opening of a door of the vehicle, to:

evaluate signal characteristics of the one or more interrogation signals at at least two different points in time;

automatically determine whether the mobile identification generator is physically moving based on the evaluation of the signal characteristics of the one or more interrogation signals communicated between the vehicle and the mobile identification generator;

in response to determining that the mobile identification generator is not physically moving, automatically deactivate the mobile identification generator such that the mobile identification generator cannot perform a subsequent authorization operation regarding the vehicle until the mobile identification generator becomes re-activated; and in response to determining that the mobile identification generator is physically moving, automatically output a locking signal to lock at least one door of the vehicle;

such that both (a) the automatic deactivation of the mobile identification generator and (b) the automatically locking of at least one door are performed based on the same signal characteristics of interrogation signals communicated between the vehicle and the mobile identification generator.

2. The access arrangement according to claim 1, further comprising a door sensor to detect an open or closed state of at least one door of the vehicle, where the transmit/receive device at the vehicle transmits the one or more interrogation signals when a closed door state is detected by the door sensor.

3. The access arrangement according to claim 1, wherein the transmit/receive device at the vehicle is further configured to receive a locking signal for locking at least one door of the vehicle, with the transmit/receive device at the vehicle transmitting the one or more interrogation signals in response to the receipt of the locking signal.

4. The access arrangement according to claim 1, wherein the control device at the mobile identification generator determines that the mobile identification generator is not physically moving and thus deactivates the mobile identification generator in response to determining that a change with respect to the signal characteristics evaluated at at least two different points in time is smaller than or equal to a predetermined threshold value.

5. The access arrangement according to claim 1, wherein the control device at the mobile identification generator outputs the locking signal to lock at least one door of the vehicle in response to determining that the mobile identification generator is physically moving, by determining that a change with respect to the signal characteristics evaluated at at least two different points in time is larger than a predetermined threshold value.

6. The access arrangement according to claim 1, wherein the transmission of interrogation signals is limited to a specific time segment or to a specific number of interrogation signals.

7. The access arrangement according to claim 1, wherein the transmission of the interrogation signals occurs in periodically recurring time intervals.

8. The access arrangement according to claim 4, wherein the mobile identification generator further comprises an actuation element for manual actuation by a user to re-activate the mobile identification generator from a deactivated state.

9. The access arrangement according to claim 1, wherein if the mobile identification generator has sent a locking signal to lock the vehicle, the mobile identification generator does not receive or evaluate any interrogation signals for a specific period of time.

10. The access arrangement according to claim 1, wherein the signal characteristics include at least one of field strength and field direction.

11. The access arrangement according to claim 1, wherein the interrogation signals transmitted by the transmit/receive device at the vehicle have signal characteristics that are at least one of identical and constant.

12. A method to operate an access arrangement for a user to control access to a vehicle, comprising the steps of:

in response to the vehicle being turned off or a closing or opening of a door of the vehicle:

transmitting one or more interrogation signals by the vehicle;

receiving the one or more interrogation signals by a mobile identification generator configured to be carried by the user;

evaluating signal characteristics of the one or more interrogation signals at at least two different points in time by the mobile identification generator;

determining whether the mobile identification generator is physically moving based on the evaluation of the signal characteristics of the one or more interrogation signals communicated between the vehicle and the mobile identification generator;

in response to determining that the mobile identification generator is not physically moving, automatically deactivating the mobile identification generator such that the mobile identification generator cannot perform a subsequent authorization operation regarding the vehicle until the mobile identification generator becomes reactivated; and in response to determining that the mobile identification generator is physically moving, automatically outputting a locking signal to lock at least one door of the vehicle;

such that both (a) the automatic deactivation of the mobile identification generator and (b) the automatically locking of at least one door are performed based on the same signal characteristics of interrogation signals communicated between the vehicle and the mobile identification generator.

13. The method according to claim 12, wherein the one or more interrogation signals are transmitted in response to detecting a closed state of at least one door of the vehicle.

14. The method according to claim 12, wherein a locking signal is received by the vehicle and in response to the locking signal the one or more interrogation signals are then transmitted by the vehicle.

15. The method according to claim 12, wherein the mobile identification generator outputs the locking signal to lock the at least one door of the vehicle in response to determining that the mobile identification generator is physically moving, by determining that a change with respect to the signal characteristics of the at least two evaluated interrogation signals is greater than a predetermined threshold value.

16. The method according to claim 12, wherein the mobile identification generator determines that the mobile identification generator is not physically moving and thus deactivates the mobile identification generator in response to determining that a change with respect to the signal characteristics of the at least two evaluated interrogation signals is smaller than or equal to a predetermined threshold value.

17. The method according to claim 16, wherein the mobile identification generator further comprises an actuation element for manual actuation by a user to re-activate the mobile identification generator from a deactivated state.

18. The method according to claim 12, wherein the interrogation signals transmitted on the part of the vehicle have signal characteristics that are at least one of identical and constant.

19. A system to operate an access arrangement for a user to control access to a vehicle, comprising:
- means for transmitting one or more interrogation signals, the means for transmitting arranged in the vehicle; and
- at least one mobile identification generator configured to be carried by the user and configured for receiving the interrogation signals and including means for, in response to the vehicle being turned off or a closing or opening of a door of the vehicle:
  - evaluating signal characteristics of the one or more interrogation signals communicated between the vehicle and the mobile identification generator at at least two different points in time;
  - determining whether the mobile identification generator is physically moving based on the evaluation of the signal characteristics of the one or more interrogation signals communicated between the vehicle and the mobile identification generator;
  - in response to determining that the mobile identification generator is not physically moving, automatically deactivating the mobile identification generator such that the mobile identification generator cannot perform a subsequent authorization operation regarding the vehicle until the mobile identification generator becomes reactivated; and
  - in response to determining that the mobile identification generator is physically moving, automatically outputting a locking signal to lock at least one door of the vehicle;
  - such that both (a) the automatic deactivation of the mobile identification generator and (b) the automatically locking of at least one door are performed based on the same signal characteristics of interrogation signals communicated between the vehicle and the mobile identification generator.

20. The system according to claim 19, wherein the mobile identification generator outputs the locking signal to lock at least one door of the vehicle in response to determining that the mobile identification generator is physically moving, by determining that a change with respect to the signal characteristics of the at least two evaluated interrogation signals is greater than a predetermined threshold value.

* * * * *